US011958731B2

(12) United States Patent
Standard et al.

(10) Patent No.: US 11,958,731 B2
(45) **Date of Patent: *Apr. 16, 2024**

(54) MULTI-POSITION LOAD DETECTION SYSTEMS AND METHODS

(71) Applicant: The Raymond Corporation, Greene, NY (US)

(72) Inventors: Adam W. Standard, Johnson City, NY (US); Erik C. Tracy, Johnson City, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,511

(22) Filed: Feb. 1, 2022

(65) Prior Publication Data

US 2022/0153563 A1 May 19, 2022

Related U.S. Application Data

(63) Continuation of application No. 16/377,858, filed on Apr. 8, 2019, now Pat. No. 11,274,021.

(60) Provisional application No. 62/653,914, filed on Apr. 6, 2018.

(51) Int. Cl.
*B66F 9/20* (2006.01)
*B66F 9/075* (2006.01)

(52) U.S. Cl.
CPC ........ *B66F 9/0755* (2013.01); *B66F 9/07559* (2013.01); *B66F 9/20* (2013.01)

(58) Field of Classification Search
CPC ....... B66F 9/0755; B66F 9/07559; B66F 9/20
See application file for complete search history.

(56) References Cited

U.S. PATENT DOCUMENTS

| | | | | |
|---|---|---|---|---|
| 2,902,105 | A | 9/1959 | Wiley et al. | |
| 3,560,678 | A | 2/1971 | Richardson | |
| 4,212,375 | A * | 7/1980 | Peterson | B66F 9/0755 187/224 |

(Continued)

FOREIGN PATENT DOCUMENTS

| | | | |
|---|---|---|---|
| CN | 203820232 | U | 9/2014 |
| CN | 204057771 | U | 12/2014 |

(Continued)

OTHER PUBLICATIONS

European Patent Office, Extended European Search Report, Application No. 19167981.0, dated Nov. 18, 2019, 21 pages.

(Continued)

*Primary Examiner* — Donald J Wallace
*Assistant Examiner* — Daniel M. Robert
(74) *Attorney, Agent, or Firm* — Quarles & Brady LLP

(57) ABSTRACT

The present disclosure provides systems and methods for detecting a load on at least one fork of a material handling vehicle. The systems and methods can comprise a housing; at least one sensor positioned within the housing; a sensor arm pivotally coupled to the housing; at least one sensor flag integral with or coupled to the inside of the sensor arm; and wherein when the sensor arm pivots inward toward the housing the at least on sensor flag triggers the at least one sensor to identify at least a first load position and a second load position.

14 Claims, 9 Drawing Sheets

(56) References Cited

U.S. PATENT DOCUMENTS

| | | | | |
|---|---|---|---|---|
| 4,266,106 | A * | 5/1981 | Fraser | H01H 3/16 200/61.44 |
| 4,331,846 | A | 5/1982 | Robinson | |
| 4,678,329 | A | 7/1987 | Lukowski, Jr. et al. | |
| 4,684,247 | A | 8/1987 | Hammill, III | |
| 6,132,164 | A | 10/2000 | Way et al. | |
| 6,194,860 | B1 | 2/2001 | Seelinger et al. | |
| 6,209,913 | B1 * | 4/2001 | Ishikawa | B66F 17/003 340/440 |
| 7,093,383 | B2 | 8/2006 | Mennen et al. | |
| 7,287,625 | B1 | 10/2007 | Harris | |
| 7,856,282 | B2 | 12/2010 | Tabor | |
| 8,224,719 | B2 | 7/2012 | Seagle et al. | |
| 9,376,299 | B2 | 6/2016 | Hoffman | |
| 9,422,083 | B1 | 8/2016 | Embleton et al. | |
| 9,456,940 | B2 | 10/2016 | DeLeo et al. | |
| 9,718,661 | B1 | 8/2017 | Hoffman | |
| 9,734,639 | B2 | 8/2017 | Smith | |
| 9,737,988 | B2 | 8/2017 | Pham et al. | |
| 9,981,837 | B2 | 5/2018 | Hoffman | |
| 11,274,021 | B2 * | 3/2022 | Standard | B66F 9/0755 |
| 2003/0080544 | A1 * | 5/2003 | Rosenkranz | B25J 19/0083 280/762 |
| 2004/0035445 | A1 * | 2/2004 | Saxon | B08B 9/0321 134/8 |
| 2005/0210713 | A1 | 9/2005 | Mennen et al. | |
| 2005/0216105 | A1 | 9/2005 | Tabor | |
| 2010/0145832 | A1 | 6/2010 | Seagle et al. | |
| 2012/0101684 | A1 * | 4/2012 | Takazato | B66F 9/07568 701/41 |
| 2012/0191272 | A1 | 7/2012 | Andersen et al. | |
| 2012/0285031 | A1 * | 11/2012 | Robert | B66F 17/006 33/787 |
| 2014/0133944 | A1 | 5/2014 | Pangrazio et al. | |
| 2014/0195127 | A1 * | 7/2014 | Hoffman | B62B 3/001 701/50 |
| 2016/0121204 | A1 | 5/2016 | Shen et al. | |
| 2016/0189443 | A1 | 6/2016 | Smith | |
| 2016/0221716 | A1 | 8/2016 | Embleton et al. | |
| 2016/0280523 | A1 | 9/2016 | Hoffman | |
| 2017/0057798 | A1 | 3/2017 | Dues et al. | |
| 2017/0102711 | A1 | 4/2017 | Watts | |
| 2017/0327360 | A1 | 11/2017 | Smith | |
| 2018/0009643 | A1 | 1/2018 | Hoffman | |

FOREIGN PATENT DOCUMENTS

| | | | | | |
|---|---|---|---|---|---|
| CN | 204689577 | U | | 10/2015 | |
| CN | 207158711 | U | | 3/2018 | |
| CN | 207175360 | U | * | 4/2018 | |
| CN | 207838579 | U | * | 9/2018 | |
| CN | 209974245 | U | | 1/2020 | |
| DE | 4430728 | A1 | * | 3/1996 | B66F 9/12 |
| EP | 0816282 | B1 | | 4/2001 | |
| EP | 1293472 | A2 | | 3/2003 | |
| EP | 2533119 | B1 | | 2/2017 | |
| JP | 2001010797 | A | * | 1/2001 | |
| JP | 2001010797 | A | | 1/2001 | |
| KR | 200400335 | Y1 | | 11/2005 | |

OTHER PUBLICATIONS

European Patent Office, Extended European Search Report, Application No. 21164210.3, dated Jul. 16, 2021, 7 pages.

* cited by examiner

MULTI-POSITION LOAD DETECTION SYSTEMS AND METHODS

CROSS-REFERENCES TO RELATED APPLICATIONS

The present application is a continuation of U.S. patent application Ser. No. 16/377,858, filed on Apr. 8, 2019, which is based on and claims priority to U.S. Provisional Patent Application No. 62/653,914, filed on Apr. 6, 2018, and entitled "Multi-Position Load Detection Systems and Methods." Each of the foregoing patent applications is incorporated herein by reference in its entirety.

STATEMENT REGARDING FEDERALLY SPONSORED RESEARCH

Not Applicable.

BACKGROUND

The present disclosure relates generally to load detection systems and, more specifically, to a multi-position load detection systems and methods for a material handling vehicle.

Material handling vehicles have been developed to transport goods loaded onto generally standardized transport platforms. For example, forklifts are often used to lift goods loaded onto a pallet. Pallets often have vertical supports connected to a top and thus define a channel. Certain known forklifts are configured to approach pallets and insert a two-tined fork into the channel between the vertical support and below the top. The pallet and loaded goods may then be lifted with the forks. The combined pallet and loaded goods may be referred to as a load.

Material handling vehicles commonly use embedded scanners or sensors to determine when a load is positioned on the forks of the vehicle. Other load detection arrangements include use of a unique set of forks with a built-in single position switch to sense when the load is in a specific position on the forks.

These previous methods only allow for one sensing range, which only indicates when a load is in one specific position. When the load has a unique shape, the previous methods may not accurately sense the specific position of the load on the forks. Furthermore, load detection arrangements that use laser scanners to detect a location of a load can incorrectly sense debris along a warehouse floor as being a load or fail to be triggered by loads with damaged pallets.

BRIEF SUMMARY

In one aspect, the present disclosure provides a system for detecting a position of a load on at least one fork of a material handling vehicle. The system can comprise a housing coupled to a carriage of the material handling vehicle, and the at least one fork coupled to the carriage, a first sensor positioned within the housing, a second sensor positioned within the housing, a sensor arm pivotally coupled to the housing, a first sensor flag extending from the sensor arm for a first activation distance, a second sensor flag extending from the sensor arm for a second activation distance. The sensor arm is configured to pivot a first distance inward toward the housing and the carriage and cause the first sensor flag to trigger the first sensor to indicate a first load position. The sensor arm is further configured to pivot a second distance inward toward the housing and the carriage and cause the second sensor flag to trigger the second sensor to indicate a second load position.

In another aspect, the present disclosure provides a system for detecting a position of a load on at least one fork of a material handling vehicle. The system can comprise a housing, with a sensor positioned within the housing and a sensor arm pivotally coupled to the housing, A sensor flag can extend from an inside of the sensor arm and extend away from the inside of the sensor arm for an activation distance, the sensor flag comprises a neck portion extending from a first end at the inside of the sensor arm and a head portion extending from a second end of the neck portion opposite the first end, the head portion being wider along the activation length than the neck portion.

In another aspect, the present disclosure provides a method in a data processing system comprising at least one processor and at least one memory, the at least one memory comprising instructions executed by the at least one processor to implement a load detection system in a material handling vehicle. The method can include the steps of receiving a first signal from a first sensor on the material handling vehicle; determining that a load is in a first position on forks of the material handling vehicle based on the first signal; indicating to at least one of an operator or a warehouse management system that the load is in the first position on the forks; receiving a second signal from a second sensor on the material handling vehicle after the first signal; determining that the load is in a second position on the forks of the material handling vehicle based on the second signal; and indicating to the at least one of the operator or the warehouse management system that the load is in the second position on the forks.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
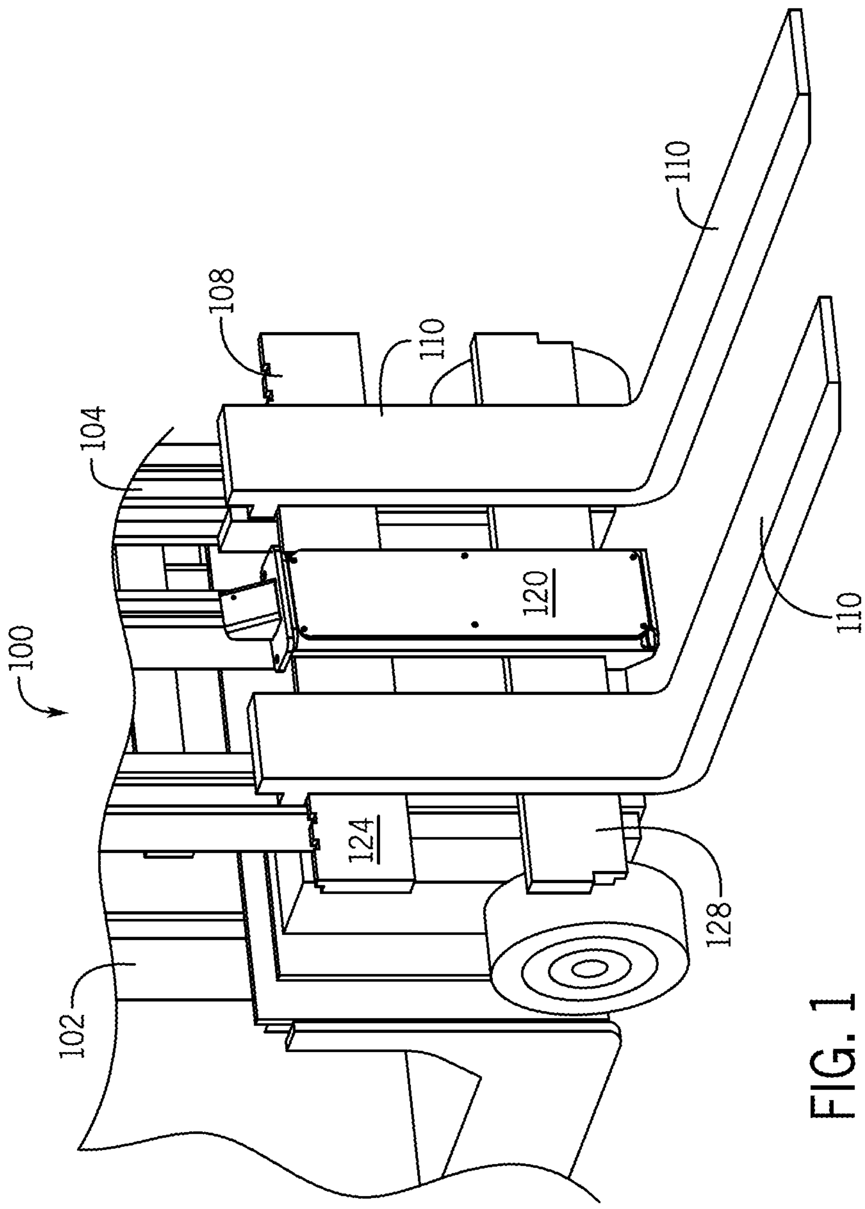
FIG. 1 is a pictorial view of a material handling vehicle with a load detection assembly according to aspects of the present disclosure.
Figure 2:
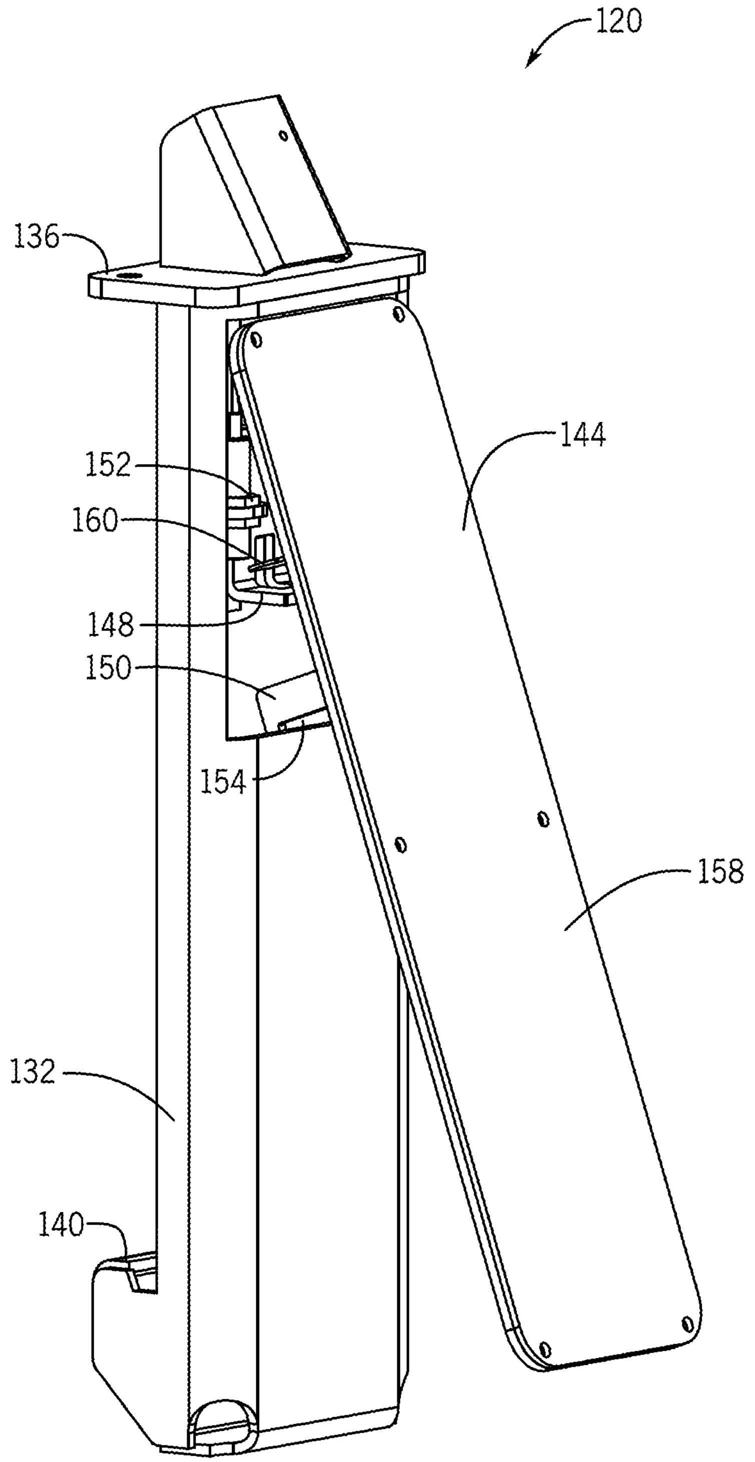
FIG. 2 is a perspective view of the load detection assembly as shown in FIG. 1, according to aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles (MHVs) are designed in a variety of configurations to perform a variety of tasks. It will be apparent to those of skill in the art that the present disclosure is not limited to any specific MHV, and can also be provided with various other types of MHV configurations, including for example, order-pickers, swing reach vehicles, and any other lift vehicles. The various systems and methods disclosed herein are suitable for any of driver controlled, pedestrian controlled, remotely controlled, and autonomously controlled material handling vehicles.

FIG. 1 illustrates one non-limiting example of a material handling vehicle (MHV) 100 in the form of a counterbalanced truck according to one non-limiting example of the present disclosure. The MHV 100 can include a base 102, a mast 104, one or more hydraulic actuators (not shown), and a carriage 108 including a pair of forks 110 on which various loads 112 (see FIGS. 7 and 8) can be manipulated or carried by the MHV 100. The mast 104 can be coupled to the hydraulic actuators such that the hydraulic actuators can selectively tilt the mast 104. The carriage 108 can be raised on the mast 104 to raise a load on the forks 110. The carriage

108 can be coupled to the mast 104 so that when the mast 104 is tilted, the carriage 108 can be tilted, and the forks 110 can be raised. A load detection assembly 120 is shown removably coupled to the crossbars 124 and 128 of the carriage 108.

Referring to the FIGS. 1-8, the load detection assembly 120 comprises a housing 132 configured to couple to the crossbars 124 and 128 of the carriage 108. In some embodiments, the housing 132 can include a top mounting portion 136 and a bottom mounting portion 140. The top mounting portion 136 and the bottom mounting portion can be arranged to be removably mounted or coupled to the crossbars 124 and 128 of the carriage 108.

A sensor arm 144 can be pivotally coupled to the housing 132. The sensor arm 144 serves to contact the load when the load is being placed on the forks 110, and the sensor arm 144 pivots toward the housing 132 as the load is moved closer to the carriage 108. A spring 146 (best seen in FIG. 4) can bias the sensor arm 144 outward and away from the housing 132 until a sensor arm tab 150 contacts the sensor arm stop 154 on the housing 132. A first end of the sensor arm 144 near the spring 146 can be positioned closer to the housing 132 and/or coupled to the housing 132 than a second end of the sensor arm 144 nearest the ground that the MHV 100 rests on. In other words, the bottommost end of the sensor arm 144 can be positioned further away from the housing 132 than the topmost end. When the sensor arm tab 150 contacts the sensor arm stop 154, the first end of the sensor arm 144 near the spring may be closer to the housing 132 than the second end of the sensor arm 144 opposite the first end. In some embodiments, the senor arm 144 can include cover layer 158 for contact with the load 112 and protection of the sensor arm 144. The cover layer 158 can be formed from plastic, metal, rubber, or any other material suitable for repeated contact with a load. In some embodiments, the sensor arm 144 and the cover layer 158 may be made from different materials. For example, the sensor arm 144 can be made from a metal such as steel while the cover layer 158 can be made from a plastic such as high-density polyethylene (HDPE).

Figure 5:
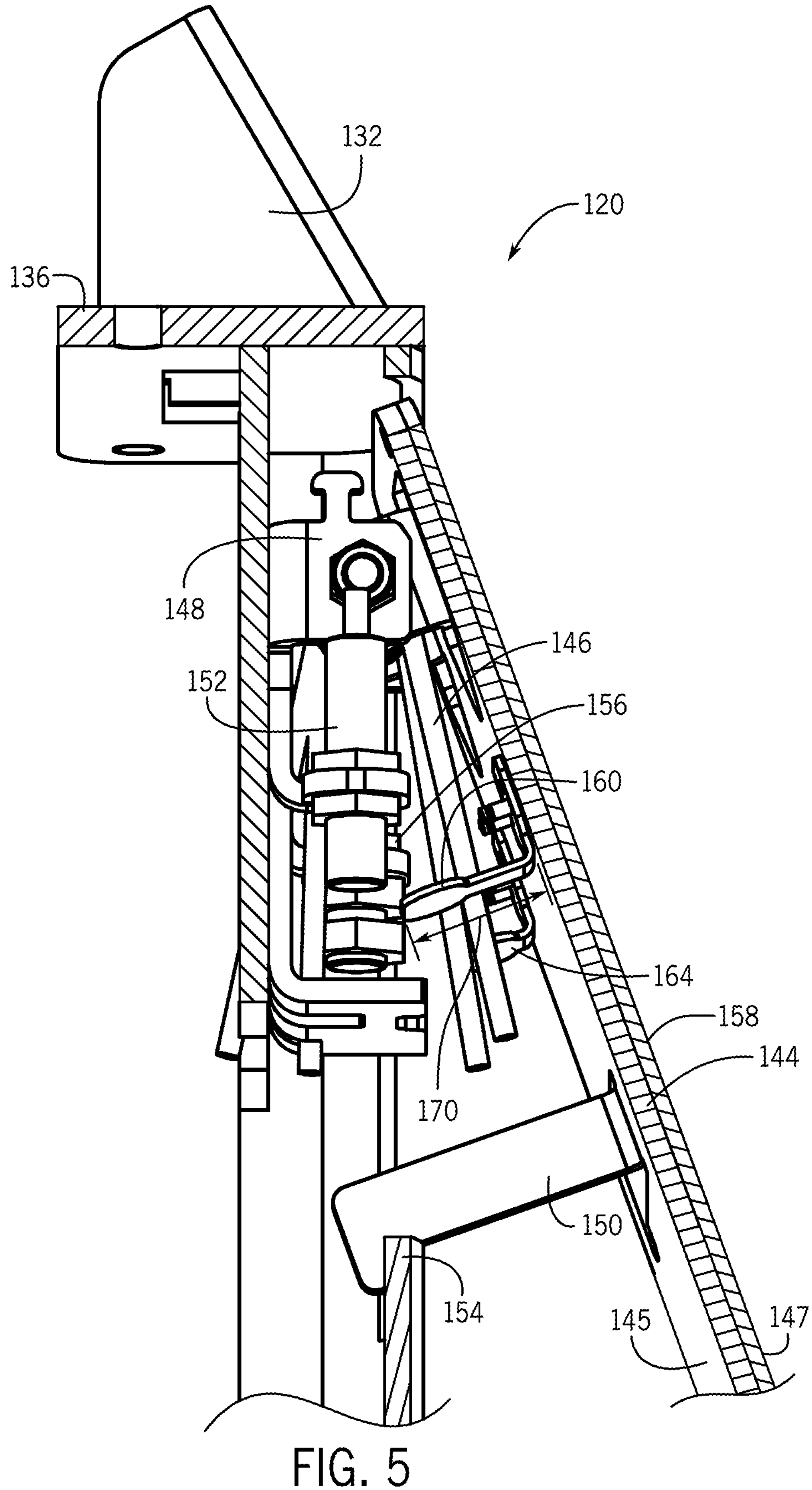
FIG. 5 is a partial side cross section view of the load detection assembly as shown in FIG. 1.
Figure 6:
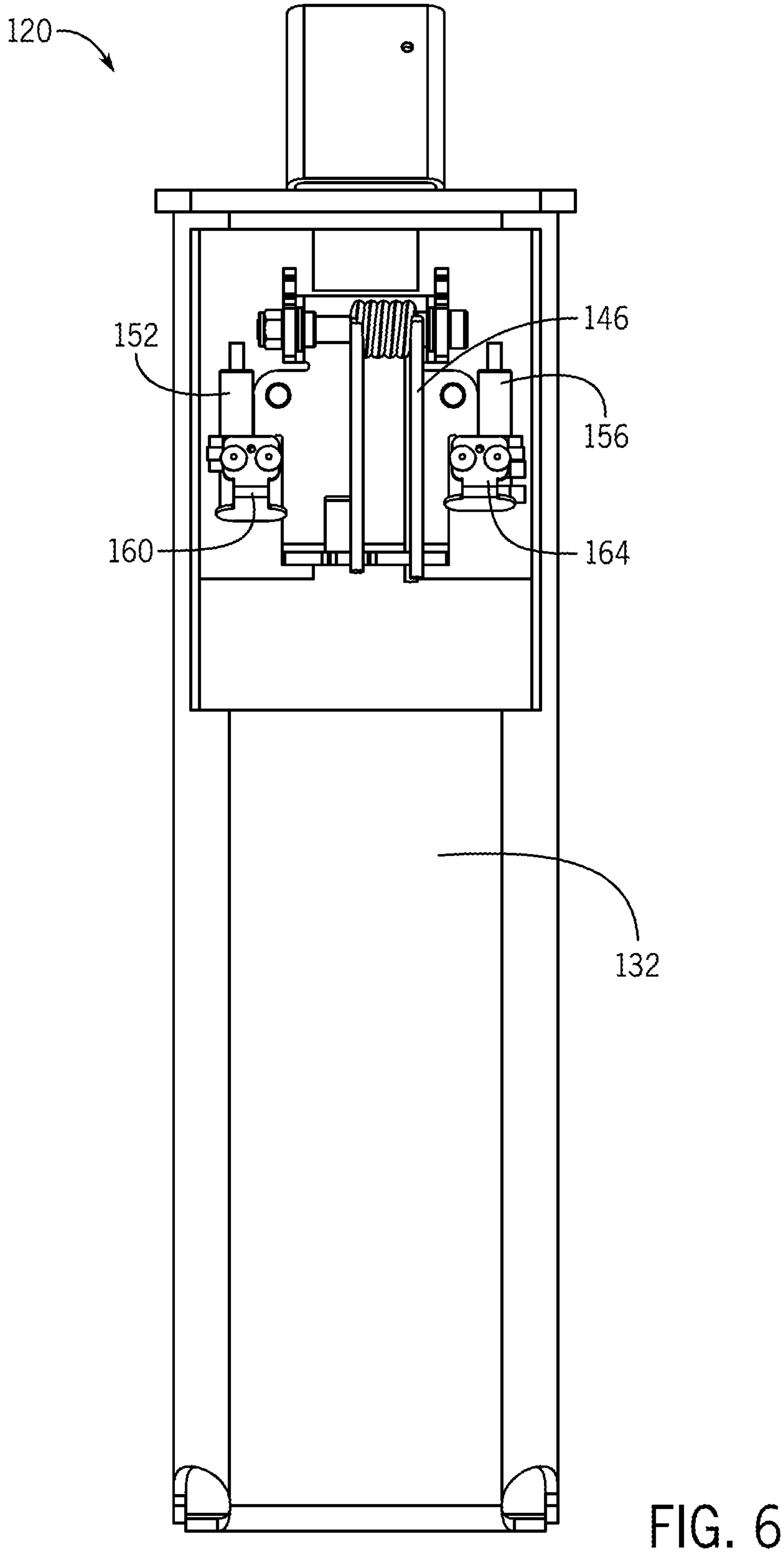
FIG. 6 is a front view of the load detection assembly as shown in FIG. 1, with the pivot arm removed.
Figure 7:
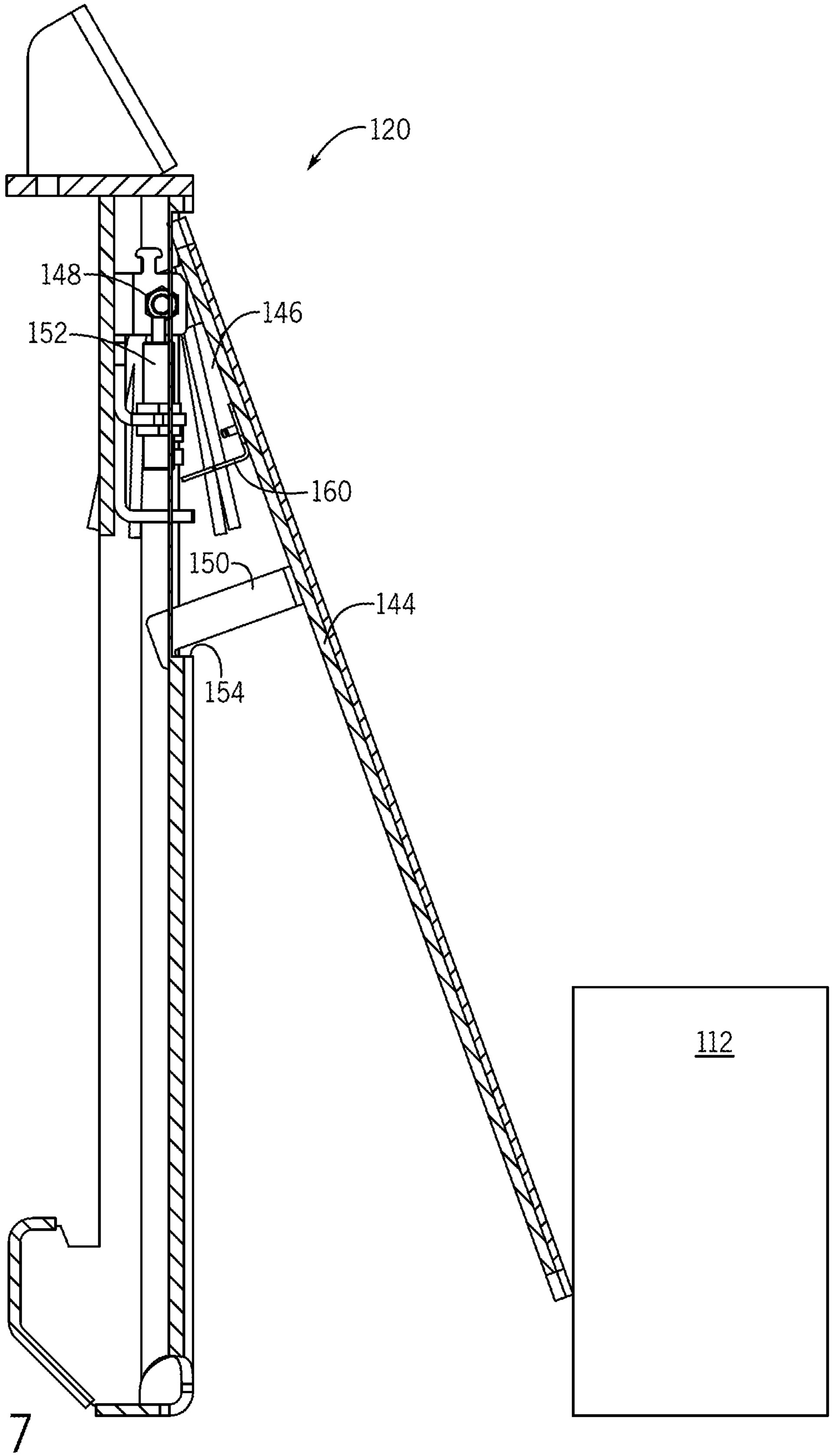
FIG. 7 is a partial side cross section view of the load detection assembly as shown in FIG. 1, with the sensor arm in a first sensing position.
Figure 8:
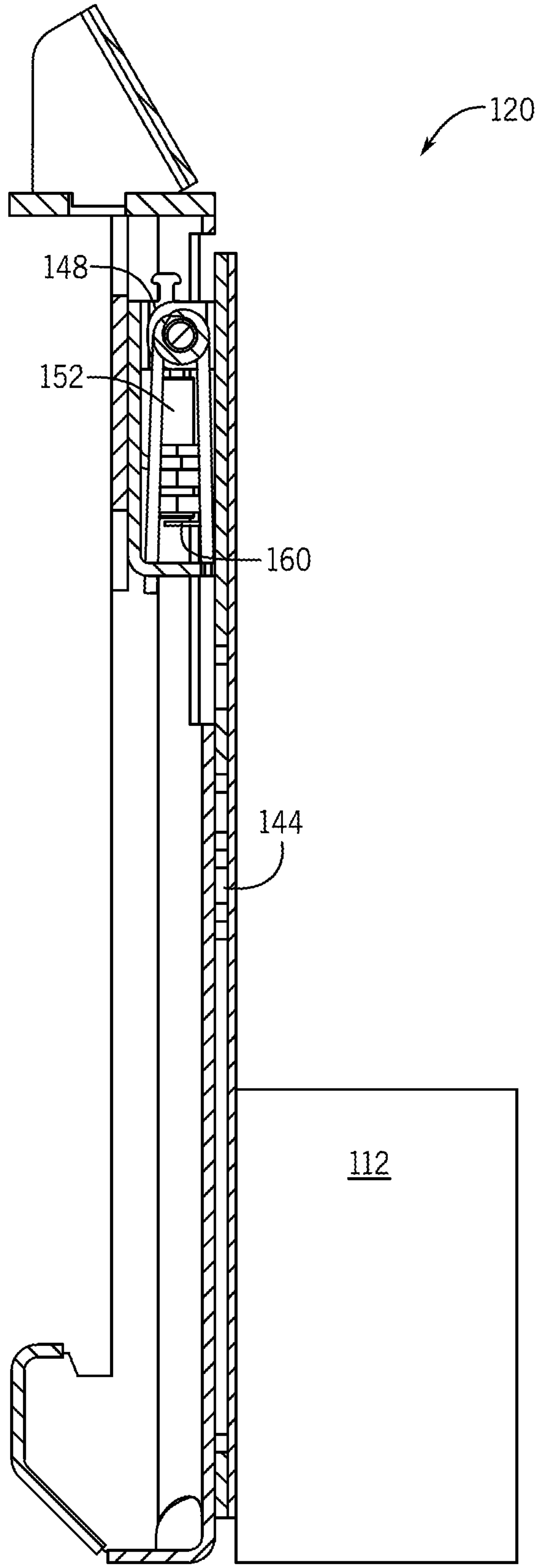
FIG. 8 is a partial side cross section view of the load detection assembly as shown in FIG. 7, with the sensor arm in a second sensing position.

Within the housing 132, one or more sensors can be mounted to a bracket 148 (best seen in FIG. 5). In the illustrated embodiment, two sensors 152 and 156 are show as proximity sensors. It is to be appreciated that a variety of styles of sensors could be used, including one or more mechanical or electrical switches, such as snap-action, or pressure switches or strain gauges, and that more than two sensors can be used to detect more than two sensor arm positions. As best seen in FIGS. 5, 7 and 8, the first sensor 152 and the second sensor 156 can be mounted an equal distance away from an inside surface 145 of the sensor arm 144 or the inside of the sensor arm 144. The sensors can be coupled to and in communication with a controller, the controller including at least one processor and one memory. The controller can be used as part of an MHV control system to detect and/or analyze signals from the sensors. The controller may also be in communication with a warehouse management system, which may be able to remotely control the material handling vehicle 100. The controller may be coupled to a human-machine interface including a display such as a heads-up display, a liquid crystal display (LCD), an organic light emitting diode (OLED) display, a flat panel display, a solid state display, a light emitting diode (LED), an incandescent bulb, etc. The display can be used by an operator to monitor operation of the load detection assembly 120.

The memory is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory, the computer readable medium, and/or within the processor during execution of the instructions.

The processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory includes multiple kinds of memory, particularly volatile memory and non-volatile memory.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Integral with or mounted to the sensor arm 144 can be two or more sensor flags extending there from, such as a first sensor flag 160 and a second sensor flag 164. The inside of the sensor arm 144 may include the inside surface 145, at least a portion of which may be planar. The inside surface 145 may include a portion of the surface of the sensor arm 144 that faces towards the sensors 152 and 156. The first sensor flag 160 and the second sensor flag 164 may each radially extend away from the inside of the sensor arm 144 and/or the inside surface 145.

In some embodiments, one or more of the sensor flags may be integral with or mounted to a portion of the sensor arm 144 other than the inside, given that the sensor flags extend away from the inside of the sensor arm 144 and towards the housing 132 and/or at least one of the sensors 152 and 156. For example, the first sensor flag 160 could be mounted on an outside 147 of the sensor arm and extend toward the first sensor 152.

Each sensor flag can have a neck portion and a head portion, such as neck portion 166 and head portion 168 of the first sensor flag 160. The neck portion 166 can extend from the inside of the sensor arm 144. The head portion 168 can extend from the end of the neck portion 166 opposite the sensor arm 144. The head portion 168 can be optimally sized and/or shaped in order to trigger the first sensor 152. For example, the head portion 168 can be sized to have a large enough surface area to trigger the first sensor 152.

Each sensor flag may extend away from the inside of the of the sensor arm 144 for an activation distance, such as activation distance 170 of the first sensor flag 160. The activation distance 170 can be the distance between the inside of the sensor arm 144 and the end of the first sensor flag 160 at the head portion 168. Along the activation distance 170, the head portion 168 can be wider than the neck portion 166. The activation distances of the sensor flags can be appropriately selected to cause the sensor flags to trigger one or more of the sensors when the sensor arm 144 is pivoted various distances, as will be explained below.

Figure 3:
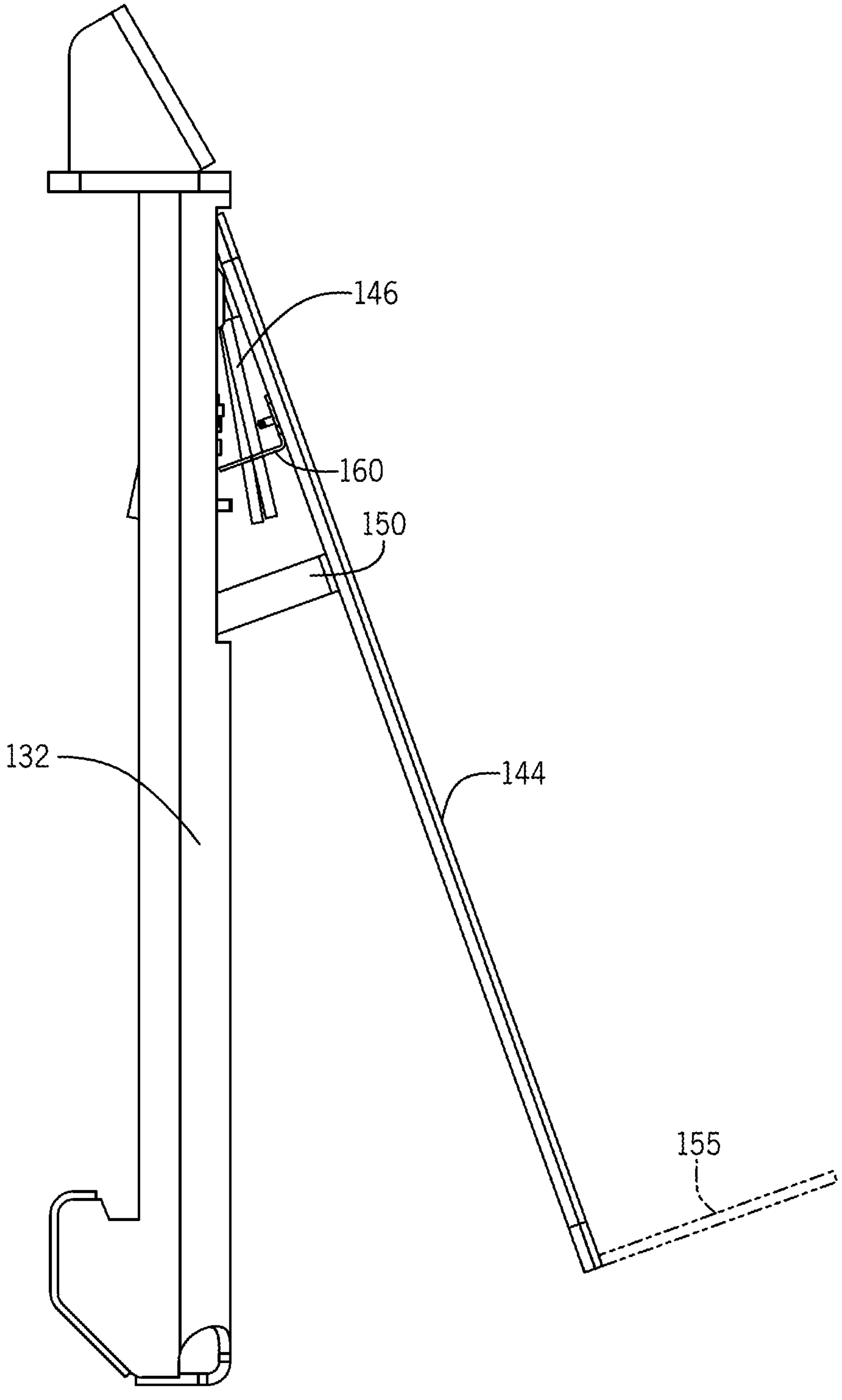
FIG. 3 is a side view of the load detection assembly as shown in FIG. 1.
Figure 4:
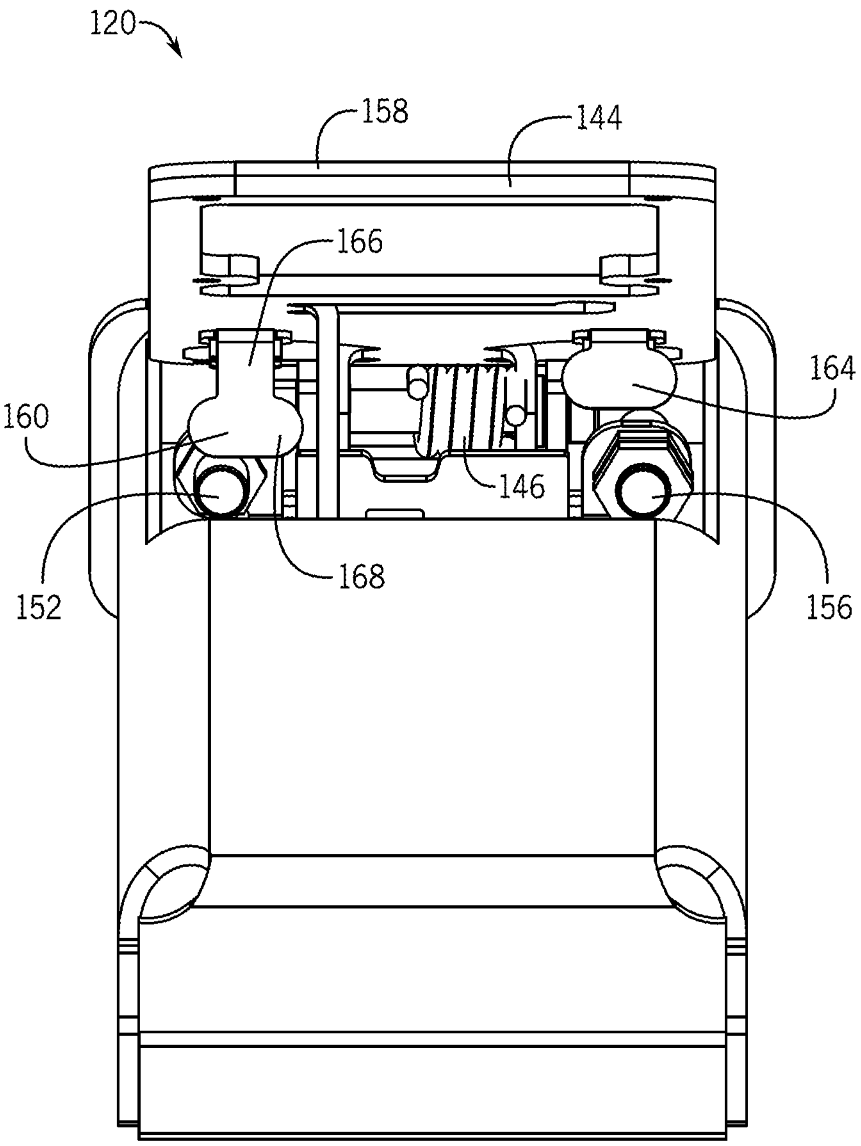
FIG. 4 is a bottom view of the load detection assembly as shown in FIG. 1, looking upward into the load detection assembly.

Neither of the first sensor 152 or the second sensor 154 are triggered when the sensor arm 144 is pivoted fully outward as shown in FIGS. 3 and 5. When the MHV 100 engages with the load 112, the load depresses and pivots the sensor arm 144, which moves the sensor flags inward and toward the two sensors 152 and 156 (see FIG. 7). As can be best seen in FIG. 5, the first sensor flag 160 is longer than the second sensor flag 164 (and the second sensor flag 164 is shorter than the first sensor flag 160). Because the sensor flags are different lengths, the longer first sensor flag 160 can trigger the first sensor 152 before the shorter second sensor flag 164 can trigger the second sensor 156.

When the first sensor 152 is triggered by the first sensor flag 160 coming into range of the first sensor 152, a first signal can be produced that can indicate the load is in a first load position, such as, the load is seated on the forks 110 (see FIG. 7). The first signal can be received by the MHV control system to indicate to the operator, or to the warehouse management system, for example, that the load is in the first load position. In some embodiments, the operator may be notified via the display that the load is in the first load position. In one example, when the load is in the first load position, the first signal received by the MHV control system can indicate to the operator the load is in a desired position and that the MHV can stop advancing to engage to load. In some embodiments, the operator may be notified via the display that the load is in the desired position. FIG. 7 shows the load detection assembly 120, and specifically the sensor arm 144 in a first engagement position, and that the load 112 is in the first load position. The sensor arm 144 can pivot inward a first pivot distance corresponding to the first engagement position.

If the MHV 100 continues to travel toward the load once the first sensor 152 is triggered, the load can continue to pivot the sensor arm 144 toward the housing 132 until the second sensor 156 is triggered. When the second sensor 156 is triggered, a second signal can be produced that can indicate that the load is in a second load position, such as, the load is fully seated on the forks 110. The second signal can be received by the MHV control system to indicate to the operator, or warehouse management system, for example, that the load is in the second load position and/or that the load is ready to be lifted, moved, or otherwise handled. In some embodiments, the operator may be notified via the display that the load is ready to be lifted, moved, or otherwise handled. In one example, when the load is in the second load position, the second signal received by the MHV control system can indicate to the operator the load has been fully seated on the forks 110 and that the MHV can stop advancing to engage to load. In some embodiments, the operator may be notified via the display that the load has been fully seated on the forks 110 and that the MHV can stop advancing to engage to load. The second signal can be used to indicate that the load is being pushed on the floor, and to signal the MHV to stop advancing. FIG. 8 shows the load detection assembly 120, and specifically the sensor arm 144 in a second engagement position, and that the load 112 is in the second load position. The sensor arm 144 can pivot inward a second pivot distance associated with the second engagement position. The first pivot distance may be shorter than the second pivot distance.

The load detection assembly 120 can provide unique features of being able to have two or more dedicated sensing ranges. By changing which sensors and sensor flags are installed into the load detection assembly 120, it is possible to add or remove sensing features based on MHV option codes and customer requests. By varying the length or number of the sensors and sensor flags, the sensing ranges can also be fine-tuned.

The neck portion and/or head portion of the sensor flags may be adjustable in order to allow the operator to change the sensing ranges of the load detection assembly 120. For example, the neck portion 166 can include a number of telescoping portions that allow the operator to lengthen or shorten the activation distance 170 of the first sensor flag 160. If the operator lengthens the activation distance 170, the first pivot distance corresponding to the first engagement position is shortened. In turn, the first load position corresponding to the first engagement position will be sensed when the load 112 is further away from the vertical portion of the forks 110 than the previous arrangement. Conversely, if the operator shortens the activation distance 170, the first pivot distance corresponding to the first engagement position is lengthened, and the first load position corresponding to the first engagement position will be sensed when the load 112 is closer to the vertical portion of the forks 110 than the previous arrangement.

The operator may lengthen the activation distance 170 of the first sensor flag 160 in order to sense the load 112 sooner or that the load 112 is further away from the vertical portion of the forks 110 as compared to the previous arrangement. The operator may shorten the activation distance 170 to allow the load detection assembly 120 to sense that the load 112 is closer to the vertical portion of the forks 110 or make sure the load 112 is better seated on the forks 110 for moving or handling. The operator may lengthen the activation distance of the second sensor flag 164 in order to have the load 112 be seated further away from the vertical portion of the forks 110, which may be desirable for moving or handling certain types of loads. The operator may shorten the activation distance of the second sensor flag 164 in order to have the load 112 be seated closer to the vertical portion of the forks 110, which may be desirable for moving or handling certain types of loads.

In some embodiments, the sensors 152 and 156 can be adjustable in order to allow the operator to change the sensing ranges of the load detection assembly 120. Adjusting a sensor to be positioned further away from the sensor arm 144 and/or the corresponding sensor flag may have the same effect on a sensing range of the load detection assembly 120 as shortening the activation distance of the corresponding sensor as described above. Conversely, adjusting a sensor to be positioned closer to the sensor arm 144 and/or the corresponding sensor flag may have the same effect on a sensing range of the load detection assembly 120 as lengthening the activation distance of the corresponding sensor as described above.

As seen in FIG. 3, the sensor arm 144 may have an adjustment block 155 for adjusting multiple sensing ranges of the load detection assembly 129. The adjustment block 155 can be removably coupled to the outside 147 of the sensor arm 144 and extend away from the outside 147 in order to shorten the first pivot distance and/or second pivot distance of the sensor arm 144. The adjustment block 155 may be in contact with at least a portion of the outside 147, such as the entire outside 147 or a portion of the outside 147 near the end of the sensor arm 144 opposite the spring 146. The operator may install the adjustment block 155 in order to have the load 112 be better seated on the forks 110 for handling, such as if the load 112 would be better seated towards the middle of the forks 110. For example, if the MHV is programmed indicate a load is ready to be lifted and/or moved after receiving a signal from the second sensor 156, the operator may select an adjustment block 155 of an appropriate size to cause the second sensor 156 to be activated by the second sensor flag 164 when the load 112 is positioned most optimally for handling on the forks 110. Installing the adjustment block 155 may have the same effect on the sensing ranges of the load detection assembly as lengthening all sensor arms and/or moving all sensors towards the sensor arm 144 and/or the corresponding sensor flag as described above. The adjustment block 155 may have the same thickness as the portion of the sensor arm without the sensor plate.

Figure 9:
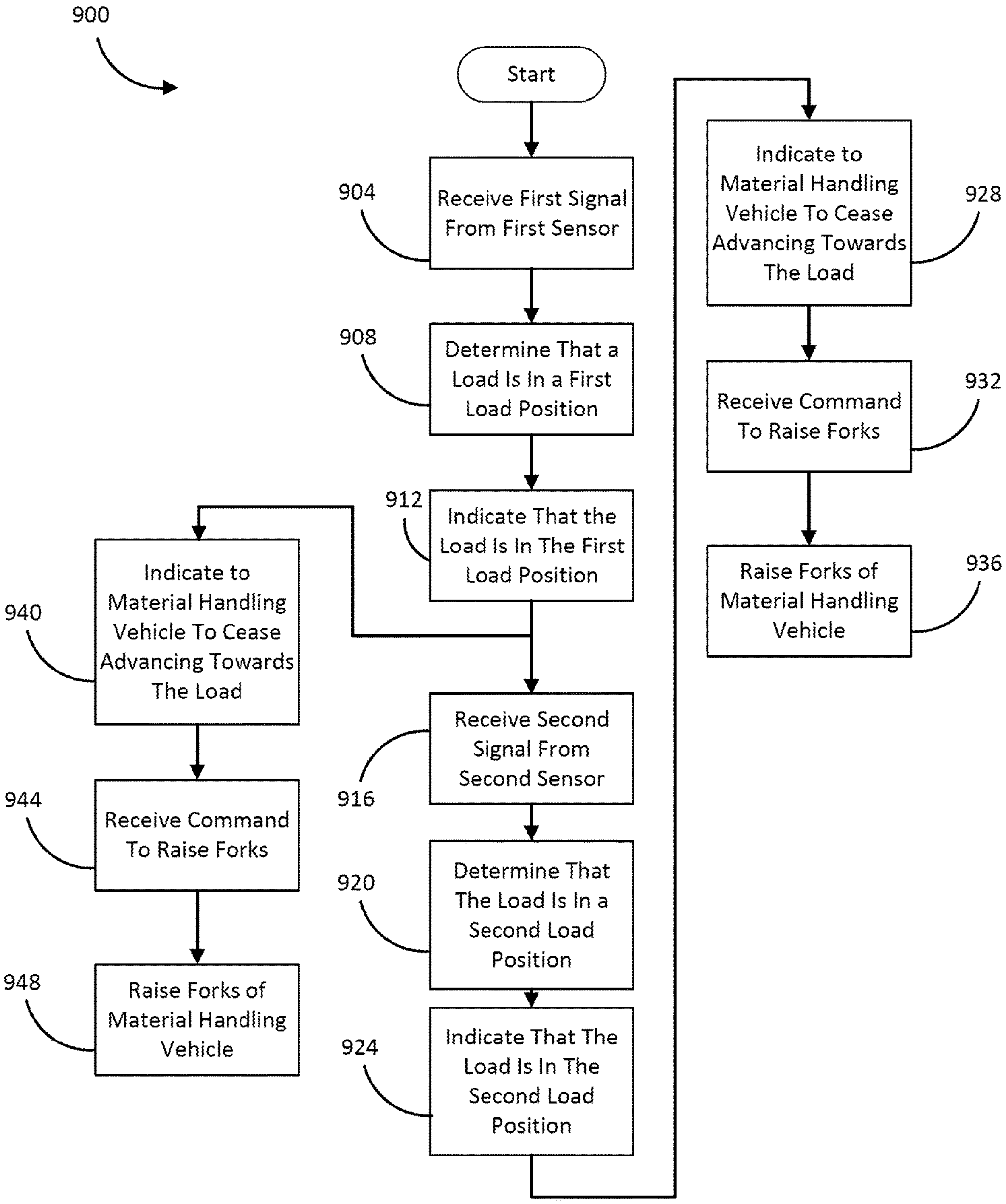
FIG. 9 is a flowchart illustrated steps for implementing load detection using the load detection assembly of FIG. 1.

Referring to FIGS. 1-8 as well as FIG. 9, an exemplary embodiment of process 900 for implementing a load detection system in a material handling vehicle is shown. The process 900 can be implemented as instructions on a memory of a computational device such as a controller coupled to and in communication with the first sensor 152 and the second sensor 156 as described above.

At 904, the process 900 can receive a first signal from the first sensor 152 coupled to the material handling vehicle 100. The first signal may be one of a plurality of values if the first sensor 152 is a polychotomous sensor such as a proximity sensor. The first signal may be a discrete value such as on or off if the first sensor 152 is a certain sensor type such as a contact switch. The process 900 can then proceed to 908.

At 908, the process 900 can determine that the load 112 is in the first load position. In some embodiments, the load 112 can be in a desired position for lifting the forks 110 and/or load 112 if the first load position has been selected to be the optimal position for lifting the load 112, i.e., that the load 112 is fully seated on the forks 110. In other embodiments, the load 112 can be in a desired position for lifting the forks 110 and/or load 112 if the second load position has been selected to be the optimal position for lifting the load 112, i.e., that the load 112 is fully seated on the forks 110. The process 900 can then proceed to 912.

At 912, the process 900 can indicate to at least one of the operator or the warehouse management system that the load 112 is in the first load position and/or seated on the forks 110. In some embodiments, the process 900 can indicate to the operator that the load 112 is in the first load position and/or seated on the forks 110 using an interface coupled to the material handling vehicle 100. The interface may be a display such as a heads-up display, a liquid crystal display (LCD), an organic light emitting diode (OLED) display, a flat panel display, a solid state display, a light emitting diode (LED), or an incandescent bulb. In some embodiments, the process 900 can indicate to the warehouse management system over a warehouse communication network such as a WiFi network that the load 112 is in the first load position and/or seated on the forks 110.

If the first load position has been selected to be the optimal position for lifting the load 112, at 940 the process 900 can indicate to the material handling vehicle 100 to cease advancing towards the load 112. For example, the process 900 may cause a system of the material handling vehicle 100 to brake and stop forward progress towards the load 112. The process 900 can then proceed to 944.

At 944, the process 900 can receive a command to raise the forks 110 a vertical distance from one of the operator or the warehouse management system. The command can be received from the operator via an input on the interface if the interface is capable of receiving inputs, such as a touch screen flat panel display. Alternatively, the command can be received from a keypad, button, switch, knob, dial, or other electromechanical input device. The command can be received from the warehouse management system over a warehouse communication network such as a WiFi network. The process 900 can then proceed to 948.

At 948, the process can cause the forks 110 to be raised the vertical distance. In some embodiments, the process 900 can control one or more hydraulic actuators to raise the forks 110. The forks 110 can in turn lift the load 112 as long as the load is in the first load position.

If the second load position has been selected to be the optimal position for lifting the load 112, the process 900 can instead proceed to 916.

At 916, the process 900 can receive a second signal from the second sensor 156 coupled to the material handling vehicle 100. The second signal may be one of a plurality of values if the second sensor 156 is a polychotomous sensor such as a proximity sensor. The second signal may be a discrete value such as on or off if the second sensor 156 is a certain sensor type such as a contact switch. The process 900 can then proceed to 920.

At 920, the process 900 can determine that the load 112 is in the second load position. Depending on the setup of the load detection assembly 120, the 900 process can then determine that the load 112 is fully seated on the forks 110 if the second load position has been selected to be the optimal position for lifting the load 112, i.e., that the load 112 is fully seated on the forks 110. The process 900 can then proceed to 924.

At 924, the process 900 can indicate to at least one of the operator or the warehouse management system that the load 112 is in the second load position, in an optimal position for lifting, and/or fully seated on the forks 110 or that the material handling vehicle 100 can stop advancing towards the load 112. In some embodiments, the process 900 can indicate to the operator that the load 112 is in the second load position, in an optimal position for lifting, and/or fully seated on the forks 110 or that the material handling vehicle 100 can stop advancing towards the load 112 using an interface coupled to the material handling vehicle 100. The interface may be a display such as a heads-up display, a liquid crystal display (LCD), an organic light emitting diode (OLED) display, a flat panel display, a solid state display, a light emitting diode (LED), or an incandescent bulb. In some embodiments, the process 900 can indicate to the warehouse management system over a warehouse communication network such as a WiFi network that the load 112 is in the second load position, in an optimal position for lifting, and/or fully seated on the forks 110 or that the material handling vehicle 100 can stop advancing towards the load 112. The process 900 can then proceed to 928.

At 928, the process 900 can indicate to the material handling vehicle 100 to cease advancing towards the load 112. For example, the process 900 may cause a system of the material handling vehicle 100 to brake and stop forward progress towards the load 112. The process 900 can then proceed to 932.

At 932, the process 900 can receive a command to raise the forks 110 a vertical distance from one of the operator or the warehouse management system. The command can be received from the operator via an input on the interface if the interface is capable of receiving inputs, such as a touch screen flat panel display. Alternatively, the command can be received from a keypad, button, switch, knob, dial, or other electromechanical input device. The command can be received from the warehouse management system over a warehouse communication network such as a WiFi network. The process 900 can then proceed to 936.

At 936, the process can cause the forks 110 to be raised the vertical distance. In some embodiments, the process 900 can control one or more hydraulic actuators to raise the forks 110. The forks 110 can in turn lift the load 112 as long as the load is in the second load position.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A system for detecting a position of a load on at least one fork of a material handling vehicle, the system comprising:

a housing;

a sensor positioned within the housing;

a sensor arm pivotally coupled to the housing; and a sensor flag extending from an inside of the sensor arm and extending away from the inside of the sensor arm for an activation distance, the sensor flag comprising a neck portion extending from a first end at the inside of the sensor arm and a head portion extending from a second end of the neck portion opposite the first end, the head portion being wider along the activation distance length than the neck portion.

2. The system of claim 1, wherein the sensor flag is adjustable to adjust the activation distance between a predetermined range of lengths.

3. The system of claim 1, further comprising a spring configured to bias the sensor arm outward from the housing, and wherein in a first position, a first end of the sensor arm nearest to the spring is positioned closer to the housing than a second end of the sensor arm opposite the first end and nearest to the ground that the material handling vehicle rests on.

4. The system of claim 1, further comprising a second sensor positioned within the housing and a second sensor flag extending from the sensor arm.

5. The system of claim 4, wherein the sensor flag extends a first activation distance from the sensor arm, and the second sensor flag extends a second activation distance from the sensor arm.

6. The system of claim 4, wherein the sensor arm is configured to pivot a first distance inward toward the housing and cause the sensor flag to trigger the sensor to indicate a first load position.

7. The system of claim 6, wherein the sensor arm is further configured to pivot a second distance inward toward the housing and cause the second sensor flag to trigger the second sensor to indicate a second load position.

8. The system of claim 1, further comprising a sensor arm tab extending from the sensor arm, and wherein the housing comprises a sensor arm stop configured to prevent the sensor arm from pivoting outward away from the housing when the sensor arm tab is in contact with the sensor arm stop.

9. The system of claim 1, wherein the sensor arm comprises a cover layer configured to contact the load, the cover layer being a material different than the sensor arm.

10. A method in a data processing system comprising at least one processor and at least one memory, the at least one memory comprising instructions executed by the at least one processor to implement a load detection system in a material handling vehicle, the method including the steps of:

receiving a first signal from a first sensor on the material handling vehicle responsive to a first sensor flag triggering the first sensor in accordance with a first activation distance;

determining that a load is in a first position on forks of the material handling vehicle based on the first signal;

indicating to at least one of an operator or a warehouse management system that the load is in the first position on the forks;

receiving a second signal from a second sensor on the material handling vehicle after the first signal responsive to a second sensor flag triggering the second sensor in accordance with a second activation distance, the second activation distance greater than the first activation distance;

determining that the load is in a second position on the forks of the material handling vehicle based on the second signal; and indicating to the at least one of the operator or the warehouse management system that the load is in the second position on the forks.

11. The method of claim 10, further comprising displaying on an interface coupled to the material handling vehicle that the load is in at least one of the first position and the second position on the forks.

12. The method of claim 10, further comprising:

receiving a command to raise the forks a vertical distance from one of the operator or the warehouse management system; and raising the forks the vertical distance.

13. The method of claim 10, further comprising indicating to the material handling vehicle to stop advancing towards the load in response to determining that that the load is in the first position on the forks.

14. The method of claim 10, further comprising indicating to the material handling vehicle to stop advancing towards the load in response to determining that the load is in the second position on the forks.

* * * * *